(12) United States Patent
Eberhardt et al.

(10) Patent No.: US 9,849,775 B2
(45) Date of Patent: Dec. 26, 2017

(54) FILLER NECK FOR AN AUXILIARY LIQUID RESERVOIR

(75) Inventors: Agnes Eberhardt, Bonn (DE); Ralf Kolberg, Bruhl (DE); Stefan Lenz, Bergisch Gladbach (DE); Jaroslav Maglovski, Lohmar (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/982,370

(22) PCT Filed: Jan. 5, 2012

(86) PCT No.: PCT/EP2012/000076
§ 371 (c)(1),
(2), (4) Date: Jul. 29, 2013

(87) PCT Pub. No.: WO2012/100906
PCT Pub. Date: Aug. 2, 2012

(65) Prior Publication Data
US 2013/0306665 A1 Nov. 21, 2013

(30) Foreign Application Priority Data
Jan. 28, 2011 (DE) .......................... 10 2011 009 745

(51) Int. Cl.
*B60K 15/04* (2006.01)
*F01N 3/20* (2006.01)
(Continued)

(52) U.S. Cl.
CPC ............ *B60K 15/04* (2013.01); *B60K 15/035* (2013.01); *F01N 3/2066* (2013.01);
(Continued)

(58) Field of Classification Search
CPC ..... B60K 15/04; B60K 15/035; F01N 3/2066; F01N 2610/1466; F01N 2610/1406
(Continued)

(56) References Cited

U.S. PATENT DOCUMENTS 3,907,153 A 9/1975 Mutty
4,327,783 A 5/1982 Kanno et al.
(Continued)

FOREIGN PATENT DOCUMENTS

CA 2111532 A1 6/1994
DE 1898313 U 8/1964
(Continued)

OTHER PUBLICATIONS

PCT International Search Report and Written Opinion dated Oct. 4, 2012, received on corresponding PCT Application No. PCT/EP12/00076, 7 pgs.
(Continued)

*Primary Examiner* — Anthony Stashick
*Assistant Examiner* — James Way
(74) *Attorney, Agent, or Firm* — Grossman Tucker Perreault & Pfleger, PLLC

(57) ABSTRACT

The invention relates to a filler neck (1) for an auxiliary liquid reservoir for a motor vehicle, in particular for a urea reservoir, having a neck housing (9), which defines a mouth hole stub (10) for a filler nozzle (7) and a filling channel (11) leading into the reservoir, wherein a receiving structure for a filler nozzle (7) is provided within the neck housing (9). At least one venting path, which is of enlarged cross section, at least in a section or sections, and of chamber-like or labyrinth-like design, is formed within the neck housing (9), allowing a venting flow parallel and counter to the refilling volume to flow through the neck housing (9) during refilling.

10 Claims, 5 Drawing Sheets

Figure 6:
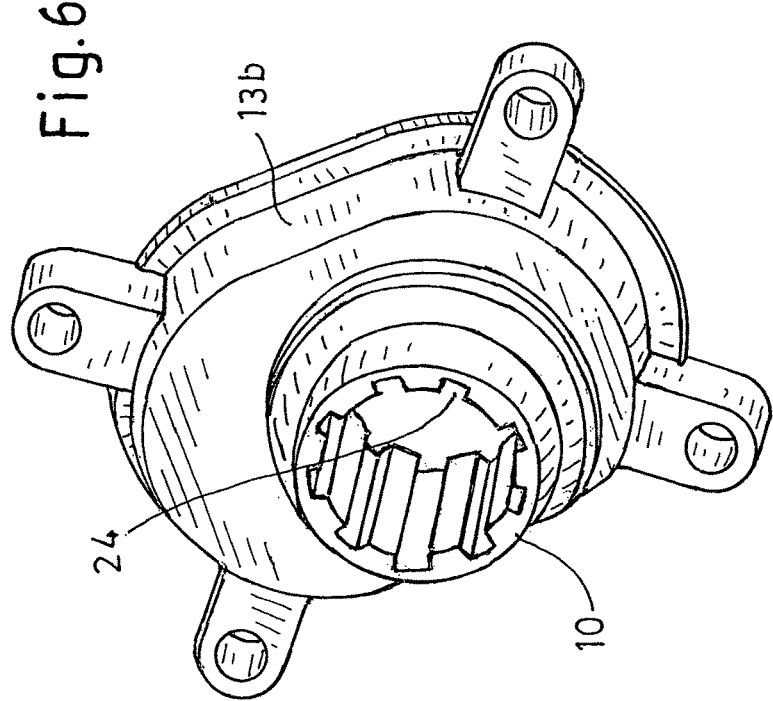

(51) Int. Cl.
*B60K 15/035* (2006.01)
*B60K 15/03* (2006.01)

(52) U.S. Cl.
CPC ............... *B60K 2015/03309* (2013.01); *F01N 2610/1406* (2013.01); *F01N 2610/1413* (2013.01); *F01N 2610/1466* (2013.01); *Y02T 10/24* (2013.01)

(58) Field of Classification Search
USPC .................................................. 220/746, 86.2
See application file for complete search history.

(56) References Cited

U.S. PATENT DOCUMENTS

| | | | |
|---|---|---|---|
| 4,572,394 A * | 2/1986 | Tanahashi et al. ......... 220/86.2 |
| 4,701,198 A * | 10/1987 | Uranishi et al. ................ 96/148 |
| 4,836,835 A * | 6/1989 | Harris et al. .................... 96/113 |
| 5,320,147 A | 6/1994 | Jamrog |
| 5,322,100 A | 6/1994 | Buechler et al. |
| 5,538,055 A | 7/1996 | Kunz et al. |
| 5,730,194 A * | 3/1998 | Foltz ..................... B60K 15/04 137/588 |
| 6,170,538 B1 * | 1/2001 | Devall ............................ 141/59 |
| 6,637,477 B1 | 10/2003 | Maier |
| 6,783,022 B2 | 8/2004 | Essing |
| 6,923,224 B1 | 8/2005 | McClung et al. |
| 7,415,997 B2 * | 8/2008 | Cisternino et al. ........... 141/368 |
| 7,997,306 B2 | 8/2011 | Kobayashi et al. |
| 8,220,508 B2 * | 7/2012 | Rongstock ..................... 141/372 |
| 8,235,078 B2 | 8/2012 | Horlacher et al. |
| 8,714,214 B2 * | 5/2014 | Cisternino .................... 141/350 |
| 8,800,611 B2 | 8/2014 | Tsiberidis |
| 2007/0108211 A1 * | 5/2007 | Zhu ............................ 220/367.1 |
| 2009/0218009 A1 | 9/2009 | Rongstock |
| 2009/0321441 A1 | 12/2009 | Horlacher et al. |
| 2013/0186894 A1 * | 7/2013 | Salzberger et al. ........... 220/86.2 |

FOREIGN PATENT DOCUMENTS

| | | |
|---|---|---|
| DE | 4242599 A1 | 6/1994 |
| DE | 19511073 A1 | 9/1996 |
| DE | 19903545 A1 | 8/2000 |
| DE | 10353669 A1 | 6/2005 |
| DE | 202007018245 U1 | 4/2009 |
| DE | 102008027462 A1 | 12/2009 |
| DE | 102008039150 A1 | 2/2010 |
| EP | 0581632 A1 | 2/1994 |
| EP | 2340956 | 7/2011 |
| JP | H10157794 A | 6/1998 |
| WO | 2007048535 A2 | 5/2007 |

OTHER PUBLICATIONS

English translation of Chinese Office Action dated May 20, 2015, received in corresponding Chinese Application No. 201280006543. 3, 6 pgs.

* cited by examiner

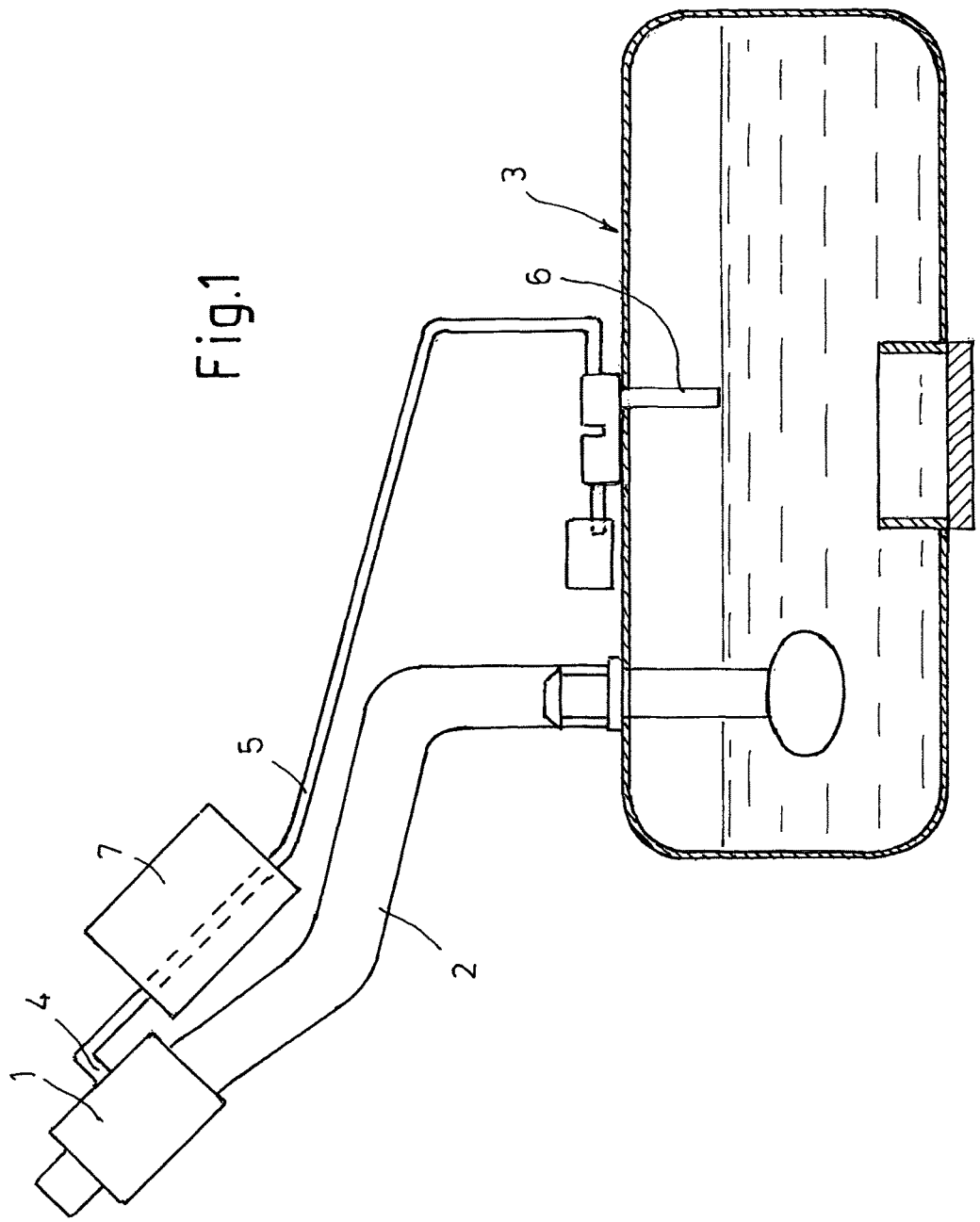

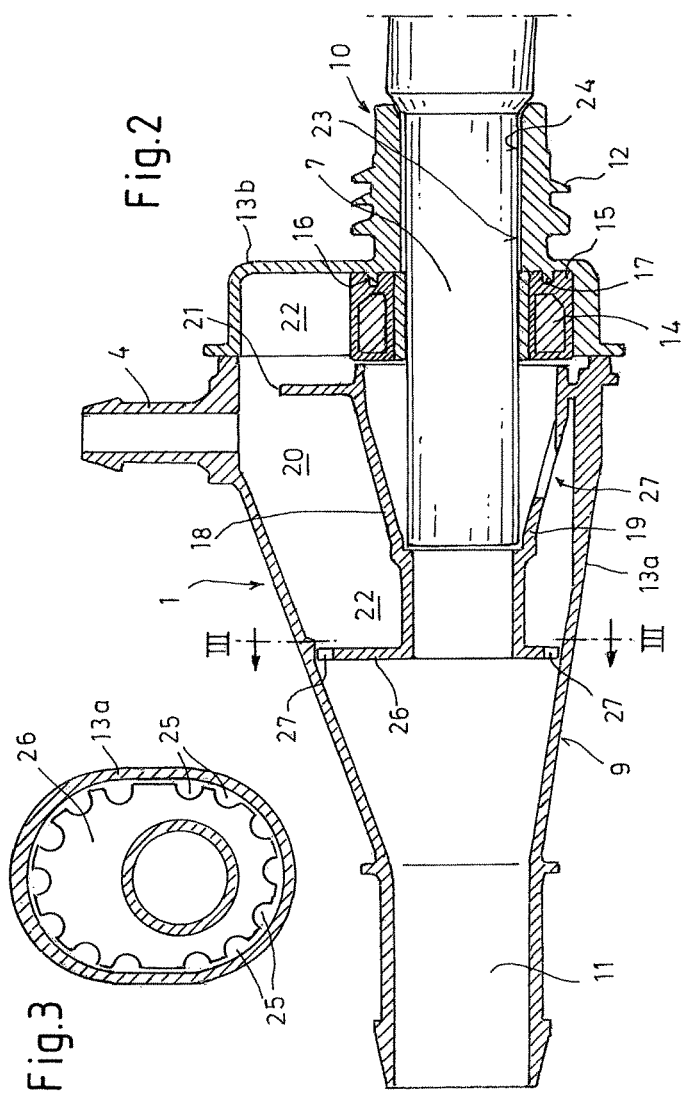

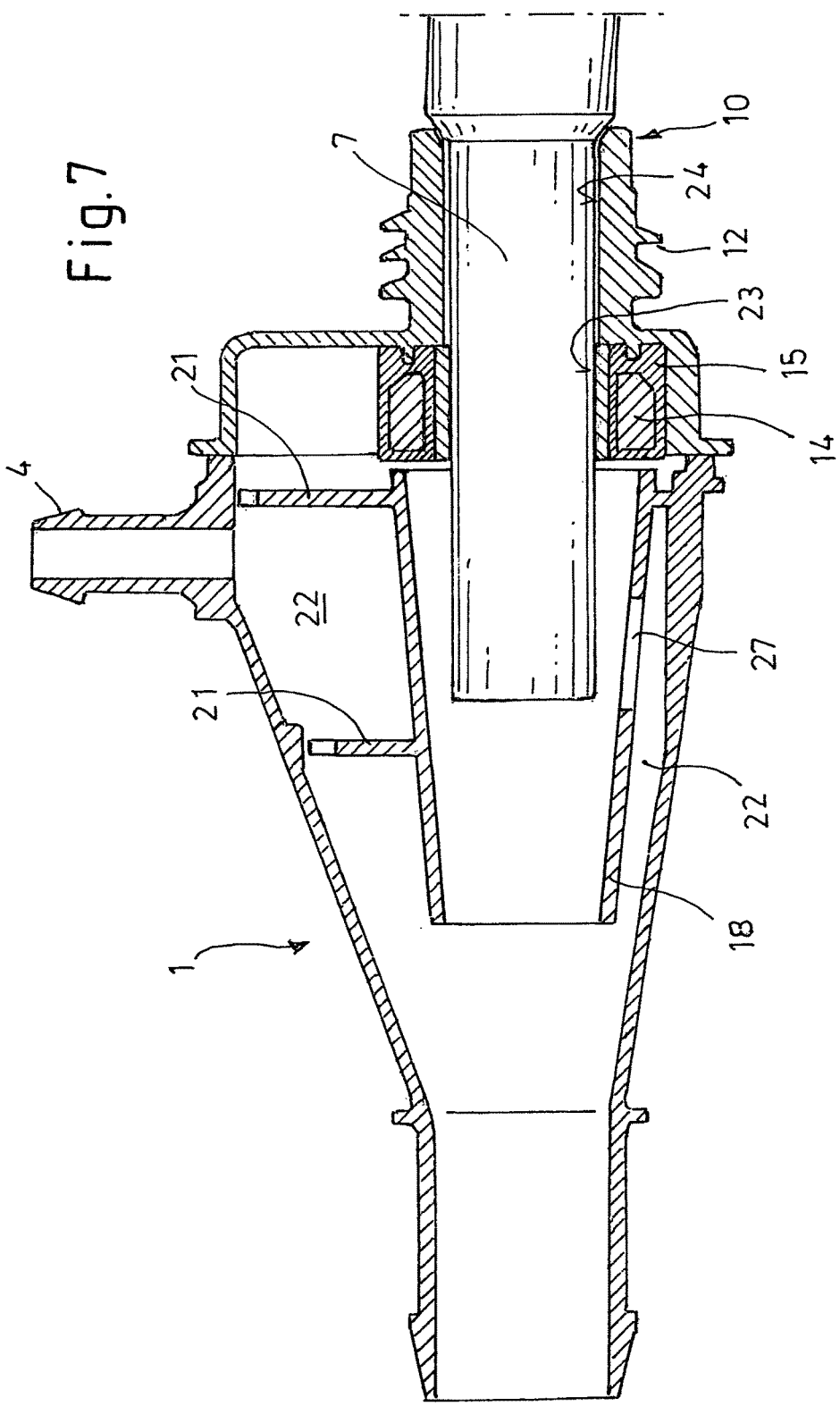

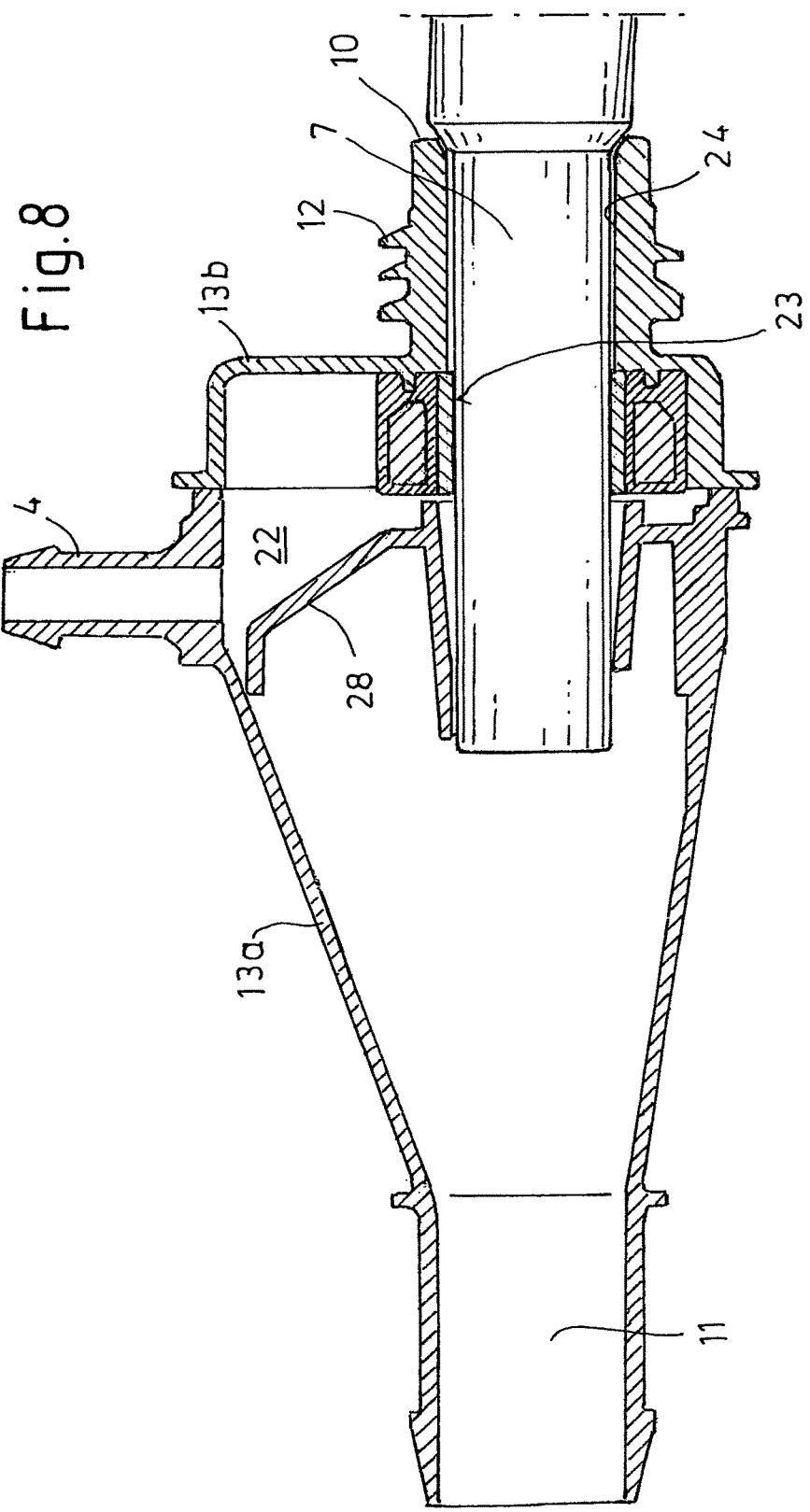

FILLER NECK FOR AN AUXILIARY LIQUID RESERVOIR

The invention relates to a filler neck for an auxiliary liquid reservoir for a motor vehicle, in particular for a urea reservoir, having a neck housing, which defines a mouth hole stub for a filler nozzle and a filling channel leading into the reservoir, wherein a receiving structure for a filler nozzle is provided within the neck housing.

A filler neck for a urea reservoir is known from DE 20 2005 011 575 U1, for example. This filler neck comprises a permanent magnet, which is accommodated in a liquid-tight manner, and a plastic holder for the permanent magnet, the filler neck being composed of plastic and the plastic holder which accommodates the permanent magnet being connected directly and in a liquid-tight manner to the filler neck. The permanent magnet is part of a system for preventing refilling errors and serves as a switching magnet for the release of a filler nozzle introduced into the filler neck. For this purpose, a holder made of plastic is inserted into the neck sleeve of the filler neck in such a way that the magnet is held in a liquid-tight manner between the neck sleeve and the holder. For this purpose, the neck sleeve of the filler neck has an inner cage at an axial distance from the opening thereof, this cage being moulded integrally with the neck sleeve. The inner cage comprises a tube section arranged concentrically with the neck sleeve, between the outer circumference of which and the inner circumference of the neck sleeve there remains an annular space. The annular space is penetrated at the end by axial vent holes.

The axial vent holes provided in the system according to DE 20 2005 011 575 U1 form a venting path which is spatially separate from the refilling volume flow. These holes are arranged in such a way, at a distance from the mouth hole, on the circumference at the end of the nozzle housing, that venting takes up a relatively large amount of installation space and does not allow refilling by the vapour recovery method, using the "Kruse bottle" for example.

In addition to the requirement for the ability to refill by the vapour recovery method, the ability to refill at a refilling rate of up to 40 1/min is desirable, especially in the case of urea reservoirs as auxiliary liquid reservoirs. At the same time, valve cut-off by means of a snifter hole/cut-off hole in the filler nozzle should be an option if at all possible.

When such a cut-off operation takes place, the pressure surges produced in the process lead to a quantity of liquid which surges upward and back again and some of which may also spray out of the filler neck, depending on the design of the filler neck. Particularly when refilling with urea, this leads to undesirable external contamination of the filler neck and the vehicle.

It is therefore the underlying object of the invention to provide a filler neck for an auxiliary liquid reservoir for a motor vehicle, in particular for a urea reservoir, which allows reliable venting, even at relatively high refilling rates, e.g. of up to 40 1/min, and which takes up relatively little installation space.

The object underlying the invention is achieved by a filler neck for an auxiliary liquid reservoir for a motor vehicle, in particular for a urea reservoir, having a neck housing, which defines a mouth hole stub for a filler nozzle and a filling channel leading into the reservoir, wherein the filler neck is distinguished by the fact that a receiving structure for a filler nozzle is provided within the neck housing and that at least one chamber-like and/or labyrinth-like venting path, which is of enlarged cross section, at least in a section or sections, is provided within the neck housing, allowing a venting flow parallel and counter to the refilling volume to flow through the neck housing and through the mouth hole during refilling. Especially because of a neck housing which is widened in cross section, preferably in a funnel shape, relative to the refilling channel, a filler neck of this kind can be such as to form a filling head with a return line from an additional vent opening into the filling head.

In a particularly advantageous embodiment of the filler neck according to the invention, provision is made for the mouth hole stub, the cross section of which is matched to the diameter of the filler nozzle, to be profiled in such a way on its inner wall directly surrounding the mouth opening that it defines at least one gas outlet channel to the atmosphere with an inserted filler nozzle. This means that, in a particularly expedient and advantageous embodiment of the filler neck according to the invention, provision is made for venting during filling to take place directly through the mouth hole or mouth hole stub. For this purpose, the mouth hole stub can, for example, be provided with a groove profile which passes right through in the filling direction, i.e. axially. This can comprise one or more grooves extending axially in a straight line or helically in the manner of the rifling in a gun barrel. When the filler nozzle is inserted into the mouth hole stub, a separation between the gas phase and the liquid phase during refilling is thus brought about by the filler nozzle itself, the outer circumference of which interacts with the profiled inner wall of the mouth hole.

By means of this embodiment of the mouth hole in the filler neck according to the invention in particular, refilling by the vapour recovery method, with an attached "Kruse bottle" for example, is possible as an alternative. A refilling operation of this kind requires that the volume of gas displaced during refilling is taken up completely by the container from which the liquid is being added. The design according to the invention enables the mouth hole stub to be fully surrounded by a union nut joint of the refilling container. The formation of appropriate gas-conducting channels within the diameter defined by the mouth hole stub is thus a significant design requirement for enabling refilling by the vapour recovery method.

Conducting the refill venting volume flow through the mouth hole of the filler neck, in particular, allows effective venting of the auxiliary liquid reservoir through the filler neck while taking up the minimum possible installation space.

The venting path is preferably formed at least in part by the receiving structure for the filler nozzle. A receiving structure of this kind can, for example, be designed as a stop nozzle or stop funnel for the filler nozzle, the cross section of which is matched to the diameter of the filler nozzle.

The receiving structure expediently forms at least one, preferably funnel-shaped, inlet channel within the neck housing.

The neck housing can surround the inlet channel, thereby forming as a venting path at least one annular space which partially surrounds the inlet channel. The annular space can also be arranged asymmetrically in relation to the inlet channel; it is not necessary for the annular space and the inlet channel to be arranged concentrically in the strictest geometrical sense.

In a particularly expedient variant, the provision of means for absorbing the surge energy of an upward-surging liquid are provided in the venting path is envisaged.

For this purpose, at least one grille or screen extending approximately transversely to the direction of flow over significant proportions of the cross section can be provided in the venting path.

The filler nozzle receiving structure defining the inlet channel can also form a system of inter-communicating venting chambers on its side facing the neck housing.

The receiving structure expediently forms a stop which limits the depth of insertion of the filler nozzle.

In a likewise very advantageous variant of the filler neck according to the invention, provision is made for the inlet channel to form a guide for the entering jet of liquid in the region of a larger cross section of the neck housing. In this case, the jet guide provided by the inlet channel can be significantly longer than the length of the filler nozzle section protruding into the filler neck.

It is expedient if at least one window-like aperture is provided in the receiving structure, allowing liquid to reach a snifter hole or cut-off hole of a filler nozzle.

Figure 4:
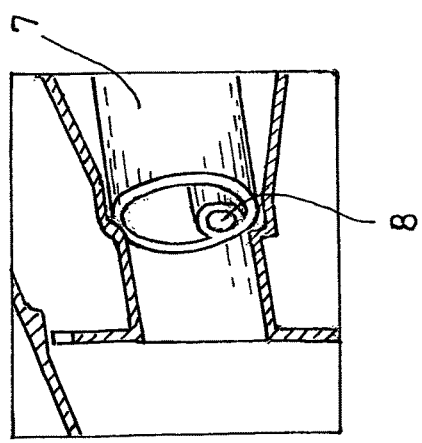
Figure 5:
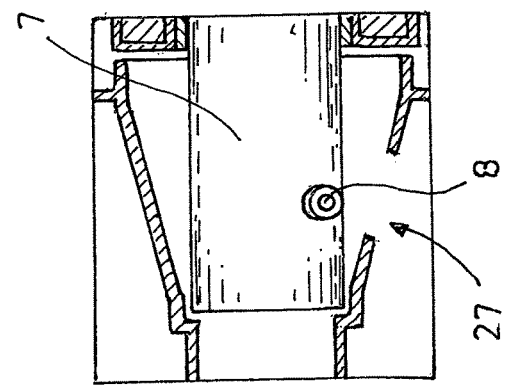

The invention is explained below with reference to an embodiment illustrated in the drawings, in which:

FIG. 1 shows a cross section through a urea reservoir with a filler neck according to the invention, FIG. 2 shows a cross section through a filler neck according to the invention with a filler nozzle inserted therein, FIG. 3 shows a section along the lines in FIG. 2, FIG. 4 shows a detail view in the region of the mouth of the filler nozzle in the filler neck with a filler nozzle with an axial cut-off hole, FIG. 5 shows a corresponding view with a filler nozzle with a radial cut-off hole, FIG. 6 shows a perspective view of part of the neck housing in the region of the mouth hole stub, FIG. 7 shows a longitudinal section through an alternative embodiment of the filler neck according to the invention, and FIG. 8 shows a cross section through a filler neck according to another embodiment of the invention.

As can be seen from FIG. 1, the filler neck 1 according to the invention is arranged on a filler pipe 2 of an auxiliary liquid reservoir 3. In the embodiment described, this auxiliary liquid reservoir is designed as a urea reservoir for a liquid urea solution as a reducing agent for catalytic removal of nitrogen from exhaust gas on a motor vehicle.

The auxiliary liquid reservoir 3 can be designed as an extrusion blow-moulded plastic reservoir of one-piece design. The filler pipe 2 and the filler neck 1 can likewise be composed of a thermoplastic. In the embodiment described, the entire arrangement comprising the filler neck 1, the filler pipe 2 and the auxiliary liquid reservoir 3 is in several parts. As will be described below, the filler neck 1 is designed as a filling head with a connection 4 for a return line 5. The return line 5 opens via a dip tube 6 as a cut-off nipple into the auxiliary liquid reservoir 3 at a predetermined venting position.

The return line 5 is routed from the auxiliary liquid reservoir 3 to the filler neck 1 via a compensating reservoir 7, which serves as a collecting reservoir for any liquid which arises in the return line 5. During the filling of the auxiliary liquid reservoir 3, a urea solution is introduced into the auxiliary liquid reservoir 3 via a filler nozzle 7, with the result that the liquid level in said reservoir rises and the gas in the auxiliary liquid reservoir 3 is displaced via the return line 5 to the filler neck 1 until the rising liquid level closes the dip tube 6. The liquid level then rises in the filler pipe 2 until it reaches and closes a cut-off hole 8 in the filler nozzle 7, thus triggering a switching operation of the filler nozzle 7. The refilling operation is thus ended.

An embodiment of the filler neck 1 according to the invention in longitudinal section with a filler nozzle 7 inserted therein is illustrated by way of example in FIG. 2.

The filler neck 1 comprises a two-part neck housing 9, which on the one hand forms a mouth hole stub 10 for receiving the filler nozzle 7 and on the other hand forms a filling channel 11, the cross section of which is matched to the filler pipe 2 and merges into the latter. On the outside, the mouth hole stub 10 is provided with a threaded collar 12, onto which a closure cap (not shown) can be screwed. The figures show the filler neck in the open state without the closure cap.

The neck housing 9 is formed by a funnel-shaped bottom part 13a and the top part 13b of cap-type design with the mouth hole stub 10.

Arranged in the top part 13, concentrically with the mouth hole stub 10, is an annular magnet 14, which interacts as a switching magnet with a sensor (not shown) of the filler nozzle 7 and brings about the release of the filler nozzle 7 inserted in the mouth hole stub 10. The annular magnet 14 is encapsulated in a liquid-tight manner in an annular plastic housing 15 and is radially fixed and centred by means of an encircling retention web 16, which engages with an encircling retention groove 17 in the plastic housing 15. The plastic housing 15 is supported axially against a receiving structure for the filler nozzle 7, said structure being designed as an inlet nozzle 18. This inlet nozzle 18 forms an inlet channel of approximately funnel-shaped design for the liquid to be introduced. Moreover, the inlet nozzle 18 in the embodiment of the filler neck illustrated in FIG. 2 forms a stop 19 for the mouth of the filler nozzle 7.

As is readily apparent from FIG. 2, the inlet nozzle and the neck housing 9 form an annular space 20 which surrounds said nozzle and widens in a funnel shape counter to the direction of entry, and which is not arranged concentrically with the inlet channel and is divided by a radially extending collar 21 of the inlet nozzle 18 into inter-communicating chambers 22. The connection 4 of the return line 5 opens into a region of the annular space 20 of widened cross section, which is divided as it were into chambers.

The gases displaced from the filler pipe 2 and via the return line 5 during refilling pass through the annular space 20 forming the vent channel into an annular gap 23 provided between the filler nozzle 7 and the mouth hole stub and are discharged to the atmosphere via profile grooves 24 in the mouth hole stub.

The design of the mouth hole stub 10 can be seen particularly from the perspective view in FIG. 6. Distributed over the inner circumference of the mouth hole stub 10 is a plurality of profile grooves 24, and, together with the outer wall of the filler nozzle 7, these profile grooves 24 form appropriate gas-conducting channels for the removal of the refilling gases. As described at the outset, the number of profile grooves extending right through in the axial direction is not critical for the invention. Moreover, these do not have to be elongate but can be arranged helically, for example.

In order as far as possible to prevent liquid from surging back into the mouth hole stub 10 during the cut-off process, the inlet nozzle 18 is provided, on the side thereof facing the filling channel 11, with a baffle plate 26 provided with apertures 25. The baffle plate 26 absorbs the surge energy while the apertures 25 allow the gas volume displaced during refilling to pass through into the chambers 22. On the side facing the filling channel 11, the annular space 20 can be closed by a screen, rather than by the baffle plate 26.

In the embodiment illustrated in FIG. 2, the inlet nozzle 18 is provided, on the side thereof facing the annular space 20, with a window-like aperture 27, which allows liquid to reach an axial or, alternatively, radial cut-off hole 8 of the filler nozzle 7.

FIG. 4 shows an enlarged partial view of the filler neck 1 according to the invention, in which the inlet nozzle 18 is designed as a stop 19 for the filler nozzle, with the filler nozzle being provided with a cut-off hole 8 (snifter hole) open at the end.

In the variant illustrated in FIG. 5, the filler nozzle 7 is provided with a circumferentially arranged, radially aligned cut-off hole 8 (Horn/Piusi). The window-like aperture 27 provided in the circumference of the inlet nozzle 18 is expedient and appropriate, particularly for filler nozzles embodied in this way.

FIG. 7 shows an alternative embodiment of the filler neck 1 illustrated in FIG. 2, said embodiment differing from the first embodiment in that the inlet nozzle 18 does not form a stop for the filler nozzle and extends significantly beyond the mouth of the filler nozzle 7 in the neck housing 9 so as to form an extended jet guide for the liquid to be introduced. Moreover, the clear cross section of the inlet nozzle 18 is significantly larger than the diameter of the filler nozzle.

Identical components are furthermore provided with identical reference signs in all the embodiments.

In the variant of the filler neck 1 illustrated in FIG. 8, the inlet nozzle is provided with an encircling collar 28, which is intended as a baffle element in order to return liquid to the filling channel 11 and as far as possible shield the chamber 22 from liquid. In this embodiment, a venting flow is provided exclusively via the return line 5 and the connection for the return line 4 into the chamber 22, and from there the flow passes via the annular gap 23 and the profile grooves 24 through the mouth hole stub 10.

LIST OF REFERENCE SIGNS 1 filler neck
2 filler pipe
3 auxiliary liquid reservoir
4 connection for return line
5 return line
6 dip tube
7 filler nozzle
8 cut-off hole
9 neck housing
10 mouth hole stub
11 filling channel
12 threaded collar
13a bottom part
13b top part
14 annular magnet
15 plastic housing for the annular magnet
16 retention web
17 retention groove
18 inlet nozzle
19 stop for the filler nozzle
20 annular space
21 collar
22 chambers
23 annular gap
24 profile grooves
25 apertures
26 baffle plate
27 aperture
28 collar

What is claimed is:

1. A filler neck for a liquid reservoir for a motor vehicle comprising:
a neck housing including a mouth hole stub having a mouth hole for a filler nozzle and a filling channel leading into the reservoir,
wherein a receiving structure for a filler nozzle is provided within the neck housing,
wherein at least one venting path is provided within the neck housing,
wherein the venting path allows a venting flow parallel and counter to the refilling volume to flow through the neck housing and through the mouth hole during refilling to atmosphere when the filler nozzle occupies the mouth hole,
wherein the mouth hole of the mouth hole stub is defined by a mouth hole wall which is profiled such that the mouth hole wall defines at least one gas outlet channel to the atmosphere when the filler nozzle is inserted in the mouth hole of the mouth hole stub,
wherein the mouth hole wall defines at least one groove profile extending in a filling direction from a first terminal end of the mouth hole stub to a second terminal end of the mouth hole stub such that the at least one groove extends along an entire length of the mouth hole from the first terminal end to the second terminal end of the mouth hole stub, and
wherein the first terminal end of the mouth hole stub including the at least one groove profile defines an entrance into the filler neck at a terminal end of the filler neck.

2. The filler neck according to claim 1, wherein the venting path is formed at least in part by the receiving structure for the filler nozzle.

3. The filler neck according to claim 1, wherein the receiving structure forms at least one funnel-shaped inlet channel within the neck housing.

4. The filler neck according to claim 1, wherein the neck housing surrounds the inlet channel, thereby forming as the venting path an annular space which at least partially surrounds the inlet channel.

5. The filler neck according to claim 1, wherein means for absorbing surge energy of upward-surging liquid are provided in the venting path.

6. The filler neck according to claim 1, wherein at least one baffle plate with at least one aperture, grille, or screen extending approximately transversely to the direction of venting flow over significant proportions of the cross section is provided in the venting path.

7. The filler neck according to claim 1, wherein the receiving structure forms a stop which limits a depth of insertion of the filler nozzle.

8. The filler neck according to claim 3, wherein the inlet channel forms a guide for an entering jet of liquid in the region of a larger cross section of the neck housing.

9. The filler neck according to claim 1, wherein at least one window-like aperture is provided in the receiving structure, allowing liquid to reach a cut-off hole of the filler nozzle.

10. The filler neck according to claim 1, wherein the mouth hole stub comprises an externally threaded collar configured to attach a closure cap thereto.

* * * * *